(12) United States Patent
Tuli

(10) Patent No.: US 10,311,870 B2
(45) Date of Patent: Jun. 4, 2019

(54) COMPUTERIZED DEVICE WITH VOICE COMMAND INPUT CAPABILITY

(71) Applicant: ecobee Inc., Toronto (CA)

(72) Inventor: Tarun Tuli, Georgetown (CA)

(73) Assignee: ECOBEE Inc., Toronto, Ontario ( * ) Notice: Subject to any disclaimer, the term of this patent is extended or adjusted under 35 U.S.C. 154(b) by 0 days.

(21) Appl. No.: 15/591,188

(22) Filed: May 10, 2017

(65) Prior Publication Data
US 2018/0330727 A1 Nov. 15, 2018

(51) Int. Cl.
| | |
|---|---|
| *G10L 15/00* | (2013.01) |
| *G10L 15/22* | (2006.01) |
| *G10L 15/08* | (2006.01) |
| *G10L 15/32* | (2013.01) |
| *G10L 15/30* | (2013.01) |
| *G06F 12/0802* | (2016.01) |
| *F24F 11/30* | (2018.01) |
| *F24F 11/64* | (2018.01) |
| *F24F 11/58* | (2018.01) |
| *F24F 110/00* | (2018.01) |

(52) U.S. Cl.
CPC ............. *G10L 15/22* (2013.01); *F24F 11/30* (2018.01); *G06F 12/0802* (2013.01); *G10L 15/08* (2013.01); *G10L 15/30* (2013.01); *G10L 15/32* (2013.01); *F24F 11/58* (2018.01); *F24F 11/64* (2018.01); *F24F 2110/00* (2018.01); *G06F 2212/283* (2013.01); *G10L 2015/088* (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 6,539,358 B1* | 3/2003 | Coon | B60R 11/0241 704/251 |
| 8,296,142 B2* | 10/2012 | Lloyd | H04M 1/04 704/231 |
| 8,452,597 B2* | 5/2013 | Bringert | G10L 15/28 704/231 |
| 9,112,984 B2 | 8/2015 | Sejnoha et al. | |
| 9,275,637 B1 | 3/2016 | Salvador et al. | |

(Continued)

OTHER PUBLICATIONS

ISA/CA, International Search Report and Written Opinion, dated Jul. 31, 2018, re PCT International Patent Application No. PCT/IB2018/053233.

*Primary Examiner* — Jesse S Pullias
(74) *Attorney, Agent, or Firm* — Perry + Currier Inc.

(57) ABSTRACT

A computerized device with voice command capability processed remotely includes a low power processor, executing a loose algorithmic model to recognize a wake word prefix in a voice command, the loose model having a low false rejection rate but suffering a high false acceptance rate, and a second processor which can operate in at least a low power/low clock rate mode and a high power/high clock rate mode. When the first processor determines the presence of the wake word, it causes the second processor to switch to the high power/high clock rate mode and to execute a tight algorithmic model to verify the presence of the wake word. By using the two processors in this manner, the average overall power required by the computerized device is reduced, as is the amount of waste heat generated by the system.

4 Claims, 3 Drawing Sheets

(56) References Cited

U.S. PATENT DOCUMENTS

| | | | |
|---|---|---|---|
| 2007/0026844 A1* | 2/2007 | Watanabe | H04M 19/041 |
| | | | 455/412.1 |
| 2007/0192109 A1* | 8/2007 | Likens | G10L 15/26 |
| | | | 704/275 |
| 2014/0222436 A1 | 8/2014 | Binder et al. | |
| 2014/0278435 A1* | 9/2014 | Ganong, III | G10L 15/22 |
| | | | 704/275 |
| 2015/0221307 A1 | 8/2015 | Shah et al. | |
| 2016/0267908 A1 | 9/2016 | Borjeson et al. | |

* cited by examiner

COMPUTERIZED DEVICE WITH VOICE COMMAND INPUT CAPABILITY

FIELD OF THE INVENTION

The present invention relates to computerized devices. More specifically, the present invention relates to computerized devices such as smartphones, HVAC controllers, light switches, power outlets, garage door opener controllers, remote sensors and the like which include the ability to act as voice command inputs to a voice command recognition system.

BACKGROUND OF THE INVENTION

Recently, access to relatively sophisticated remote processing systems has become available through data networks such as the Internet. Such so called "cloud-based" processing services can provide the results of sophisticated and/or computationally complex processes to be provided to computerized devices which would otherwise not be able to implement such services.

An interesting example of such a capability is voice recognition, which by employing analytic models with high levels of computational complexity, can provide very good recognition rates for spoken commands and phrases. The SIRI voice assistant implemented by Apple and the ALEXA Voice Service provided by Amazon are two examples of voice recognition systems which employ cloud-based processing centers to achieve their voice recognition capabilities.

To use such a system, a user will say a predefined word or phrase, referred to herein as a "wake word", followed by a spoken command in the presence of a voice command input device. In such systems, the voice command input device (an Amazon ECHO, etc. for ALEXA and an iPhone, etc. for SIRI) continually captures and monitors an audio stream picked up via one or more microphones on the device. The voice command input device listens for the predefined "wake word" to be spoken by a user within audio pick up range of the device, followed by a command. An example of valid command to such a system could be, "ALEXA, what is the time?", where "ALEXA" is the wake word.

The captured audio stream is processed by the voice command input device to detect when/if the wake word has been spoken by a user. When such a positive determination is made, the voice command input device connects to the associated cloud-based processing service and streams the audio captured by the voice command input device to that processing service (i.e.—in the case of the Echo, to the Amazon Voice Service).

The processing service analyzes the received audio stream to verify the presence of the wake word and to determine the command, if any, spoken by the user. The processing service then determines the appropriate response and sends that response back to the device (i.e.—a voice message such as, "It is now 3:04 PM") or to another system or device as appropriate. The range of possible responses is not limited and can include voice and/or music audio streams, data, commands recognized by other connected devices such as lighting controls, etc.

The use of a cloud-based processing service is preferred for such systems as the computational complexity to appropriately analyze the received audio to determine content and meaning is very high, and is presently best implemented in special purpose hardware such as GPU or FPGA based processing engines. Such hardware is too expensive, physically too large and/or has power requirements that exceed that available in many computerized devices, especially those powered by batteries, and thus cannot be included in many computerized devices such as smartphones, HVAC controllers, light switches, etc.

Therefore, the ability to provide voice command capabilities to control computerized devices, especially those such as computerized light switches or power outlets and other so called Internet of Things devices ("IoT"), is a very desirable thing to do as many such computerized devices cannot reasonably or economically be provided with hardware such as keyboards, touchscreens or the like to otherwise allow control of the devices.

However, the computational requirements for a computerized device to reliably interact with a cloud-based processing service are not easily met by many computerized devices, hence the current need for voice command input devices such as the Echo device and/or Google's Home device. In particular, the voice recognition models which are required to be executed by the voice command input device to capture and recognize the watch word require processors with high computational capabilities to be employed in the voice command input device. Such high powered processors generate significant amounts of waste heat when operating, which can be a problem in many other devices, such as IoT devices, or consumer worn or carried devices or HVAC controllers and remote sensors. Further, such high powered processors generally require a significant amount of electrical power, which can be a problem for battery powered, or parasitically powered devices (i.e.—computerized devices which obtain their operating power from the control signals of the devices they are controlling). Additionally, the time required to process the wake word, prior to relaying the voice command to the cloud service adds to the voice system's overall latency, decreasing user satisfaction.

Unfortunately, the cost of special purpose voice command input devices such as the Echo and/or Home can slow the adoption and use of such services. It is desired to have a system and method of providing a computerized device with voice command input capability in a reliable, economical and cost effective manner.

SUMMARY OF THE INVENTION

It is an object of the present invention to provide a novel system and method for providing computerized devices with voice command capability processed remotely and which obviates or mitigates at least one disadvantage of the prior art.

According to a first aspect of the present invention, there is provided a method of recognizing a wake word for voice commands to a computerized device, comprising the steps of: (i) receiving at the computerized device an audio signal from at least one microphone; processing the received audio signal with a first processor in the computerized device, the first processor placing a copy of the processed received audio signal into a circular buffer of a preselected size and the first processor executing a first voice recognition algorithmic model to detect the presence of a predefined wake word, the first voice recognition algorithmic model selected to provide a predefined relative low level of false non-matches of the predefined wake word at the cost of a higher than predefined level of false matches of the predefined wake word; upon the first processor determining a match of the predefined wake word, the first processor providing a signal to a second processor in the computerized device, the second processor normally operating at a first rate having a first computational capacity, the signal causing the second processor to commence operating at a second rate having a second computational capacity greater than the first computational capacity, and the second processor: (a) copying the contents of the circular buffer into a second buffer; (b) copying the processed received audio signal into a third buffer; executing a second voice recognition algorithmic model on the contents of the second buffer to verify the presence of the predefined wake word, the second voice recognition algorithmic model requiring greater computational processing than the first voice recognition algorithmic model to achieve a predefined relatively low level of both false non-matches and false matches of the predefined wake word; (c) upon completion of analyzing the contents of the second buffer with the second voice recognition algorithmic model, if the second voice recognition algorithmic model determines that the predefined wake word is not present in the second buffer, returning the second processor to operate at the first rate and, if the second voice recognition algorithmic model determines that the predefined wake word is present in the second buffer, then forwarding the contents of the second buffer and the third buffer to a voice processing service located remote from the computerized device, the voice processing service operable to receive and process voice commands.

Preferably, the voice processing service executes a third voice recognition algorithmic model requiring greater computational processing than the second voice recognition algorithmic model, the voice processing service executing the third voice recognition algorithmic model on the copy of the second buffer received at the voice processing service to verify the presence of the wake word therein and, if the third voice recognition algorithmic model does not verify the presence of the wake word, then the voice processing service sending a message to the computerized device indicating that the wake word was not present and the second processor returning to operating at the first rate and, if the third voice recognition algorithmic model does verify the presence of the wake word, then the voice processing service processing the contents of the third buffer.

According to another aspect of the present invention, there is provided a computerized device comprising: at least one microphone to capture user voices; a first processor to digitize and process audio received from the at least one microphone and to store a copy of the processed audio in a circular buffer and to execute a first voice recognition algorithmic model to detect the presence of a predefined wake word in the circular buffer, the first voice recognition algorithmic model selected to provide a predefined relative low level of false non-matches of the predefined wake word at the cost of a higher than predefined level of false matches of the predefined wake word; a second processor normally operating at a first rate having a first computational capacity and responsive to a signal from the first processor indicating that the first voice recognition algorithmic model has detected the presence of the wake word in the circular buffer such that the second processor commences operation at a second rate having a greater computational capacity that the capacity at the first rate, the second processor receiving a copy of the contents of the circular buffer from the first processor and receiving and buffering a copy of the processed received audio stream in a second buffer, the second processor executing a second voice recognition algorithmic model on the copy of the contents of the circular buffer to verify the presence of the predefined wake word, the second voice recognition algorithmic model requiring greater computational processing than the first voice recognition algorithmic model and being selected to achieve a predefined relatively low level of both false non-matches and false matches of the predefined wake word higher than achieved by the first processor; a data communications module operable to provide data communication between the computerized device and a remote voice processing service, the data communications providing the voice processing service with the copy of the contents of the circular buffer and the contents of second buffer to the voice processing service when the second voice recognition algorithmic model verifies the presence of the wake word in the copy of the contents of the circular buffer.

The present invention provides a computerized device with voice command capability that is processed remotely. The device includes a low power processor, executing a loose algorithmic model to recognize a wake word prefix in a voice command, the loose model having a low false rejection rate but suffering a high false acceptance rate, and a second processor which can operate in at least a low power/low clock rate mode and a high power/high clock rate mode. When the first processor determines the presence of the wake word, it causes the second processor to switch to the high power/high clock rate mode and to execute a tight algorithmic model to verify the presence of the wake word. By using the two processors in this manner, the average overall power required by the computerized device is reduced, as is the amount of waste heat generated by the system.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
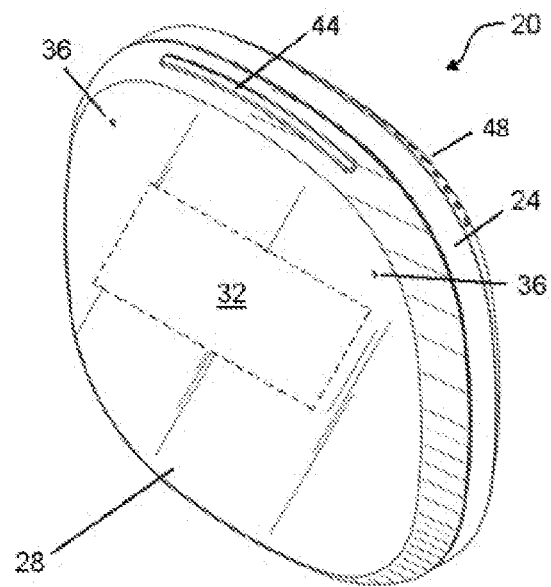
FIG. 1 shows a perspective view of a computerized device in accordance with an embodiment of the present invention.
Figure 2:
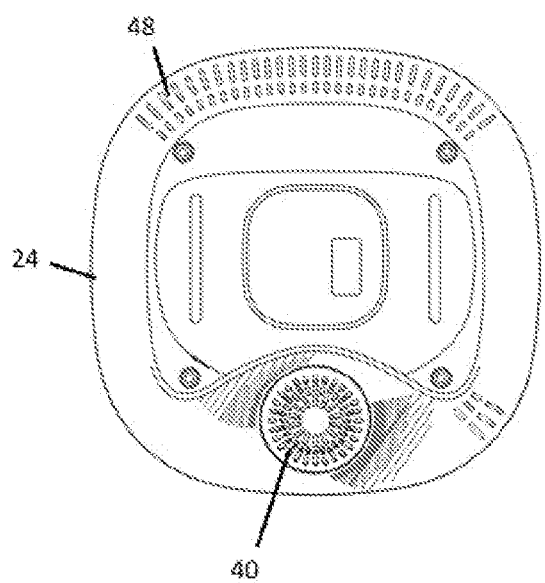
FIG. 2 shows a rear view of the computerized device of FIG. 1.
Figure 3:
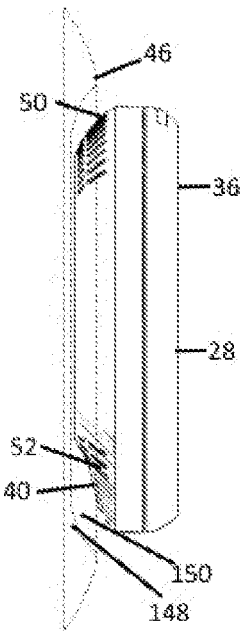
FIG. 3 shows a side view of the computerized device of FIG. 1 with a trim plate shown in phantom.

An example of a computerized device in accordance with the present invention is shown in FIGS. 1 through 4, wherein a computerized HVAC controller is indicated generally at 20. While much of the following description describes an HVAC controller, the present invention is not so limited and it is intended that the system and method can be employed in a wide range of computerized devices such as smartphones, smart watches, garage door opener controllers, internet connected home appliances, handheld computing devices, etc.

Device 20 comprises a housing 24 with a front face 28 that includes at least a portion which is transparent and through which a touchscreen 32 can be viewed and interacted with. Front face 28 can also be equipped with a motion sensor (not shown), which can be used as an occupancy sensor, detecting a user's presence and/or proximity to device 20.

Touchscreen 32 can display a wide variety of information, including operating messages, command response text, icons, controls and menus and can receive inputs from a user to vary operation of device 20 if desired.

Device 20 further includes a pair of spaced microphone apertures 36 which allow sounds from outside housing 24 to reach one or more internal microphones (described below) and a speaker grate 40 (best seen in FIGS. 2 and 3) which allows sounds emitted from an internal speaker (also discussed below) to exit housing 24. Device 20 further includes an activity indicator 44, which can be a light pipe driven by one or more LEDs, a lamp assembly, etc. Housing 24 will typically be mounted to a wall or other surface via a trim plate 46 (shown in phantom in FIG. 4) or direct mounted to the wall (not shown) without a trim plate. Spaced around the device are plurality of cooling vents 48.

Housing 24 further includes a bevel 50 on its rear face (best seen in FIGS. 2 and 3), which creates an air gap between the device 20 and the trim plate 46 or wall. In particular, bevel 50 includes an increased slope area 52 on its bottom edge around speaker grate 40. Speaker grate 40 is spaced far apart form microphone apertures 36 to minimize interference.

Figure 4:
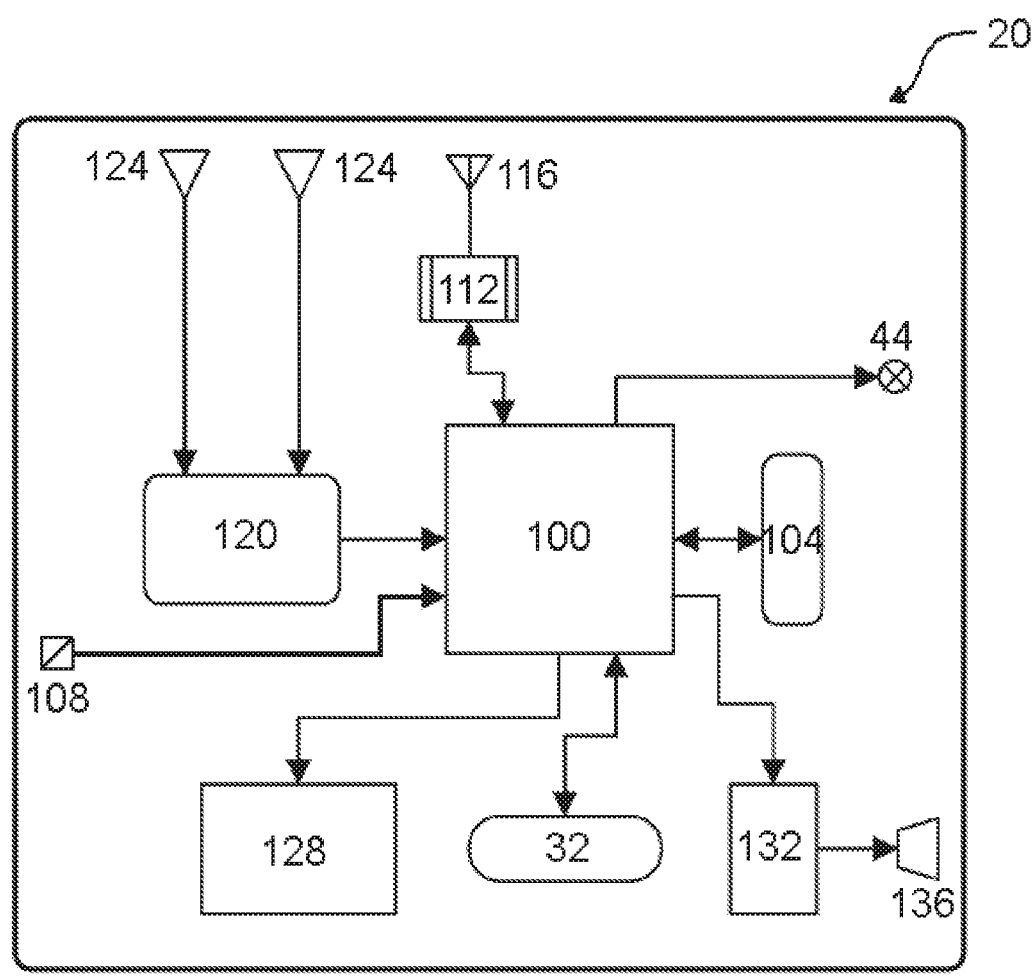
FIG. 4 shows a block diagram of the hardware of the device of FIG. 1.
Figure 6:
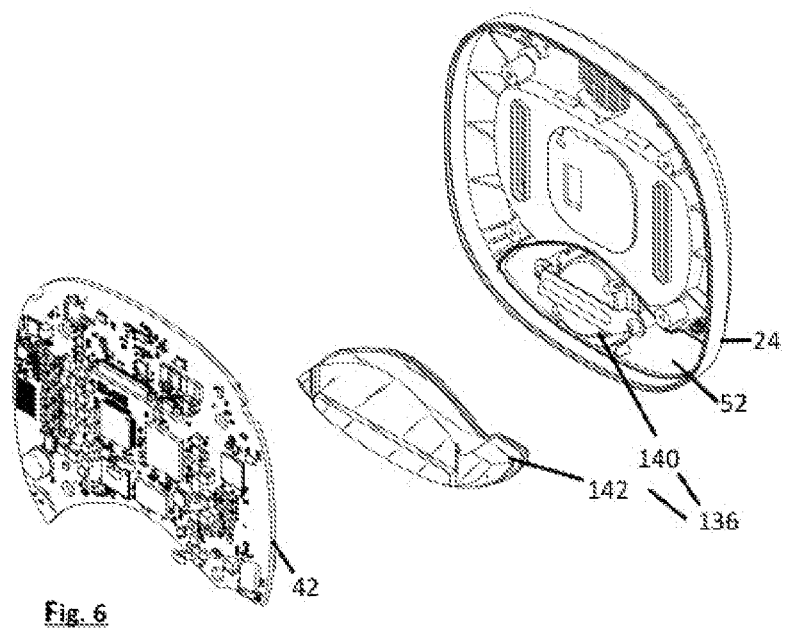
FIG. 6 shows an exploded view of the hardware of the device of FIG. 1, including its speaker system.

FIG. 4 shows a block diagram of the internal hardware 42 of device 20, and FIG. 6 shows an exploded view of internal hardware 42. Hardware 42 20 includes an application processor 100, which can be a microprocessor or any other suitable device as will occur to those of skill in the art. Processor 100 is capable of running at different clock rates, to match available program execution rates to computational needs, which can change from time to time. Such multi rate processors are well known. Device 20 further includes memory 104, which can be non-volatile RAM and/or volatile RAM which is accessible by processor 100. As will be apparent to those of skill in the art, memory 104 can be integral with processor 100, or can be separate discrete devices or components, as desired.

Typically, memory 104 will store one or more programs for execution by processor 100, as well as various parameters relating to the execution of the programs and data and working values required by the programs.

Touchscreen 32 is operatively connected to processor 100, as is the motion sensor (if present), and device 20 further preferably includes a real time clock, either as a service provided in processor 100, or as a separate component, not shown.

Device 20 can also include at least one environmental sensor 108, which at a minimum is a temperature sensor but can also include other environmental sensors, such as a humidity sensor, ambient light sensor, magnetic compass, GPS receiver, etc. which determine respective environmental conditions to be controlled and/or monitored. Typically, when device 20 is an HVAC controller, environmental sensors 108 in device 20 will include at least both a temperature sensor and a humidity sensor.

A communication module 112 connected to processor 100 to allow processor 100 to communicate with communication networks such as the Internet and/or with additional external sensors or computerized devices (not shown). Preferably, communication module 112 is operable to connect to the desired data networks wirelessly, via an antenna 116, using at least one wireless communication protocol, such as WiFi; Bluetooth; ZigBee; ZWave; Cellular Data, etc., but it is also contemplated that communication module 112 can have a wired connection to the data networks, such as via an Ethernet connection.

Communication module 112 also allows device 20 to communicate with Internet based services (such as weather servers, remote monitoring systems, data logging servers, voice processing services, etc.) and with applications used remotely by users of device 20 to monitor and control the controlled premises' environmental state or other conditions. For example, a user remote from device 20 may access an application executing on a smartphone or personal computer to send commands to device 20, via the Internet or other data communications network or system, to alter the operation of device 20 or a system it is controlling.

Device 20 further includes a secondary processor assembly 120, which is capable of digitizing and processing, as described in more detail below, audio signals received from at least one, and preferably two or more, microphones 124. In the present embodiment, secondary processor assembly 120 is a DSP (digital signal processor) which can receive inputs from microphones 124 (which are located within housing 24 adjacent apertures 36), digitize them and perform signal processing operations on those digitized signals in accordance with one or more programs stored within the DSP. While the current embodiment employs a single device DSP with the required capabilities, it is also contemplated that secondary processor assembly 120 can be constructed from two or more discrete components, if desired. It is also contemplated that secondary processor assembly 120 can be a separate computational core, or cores, included in processor 100.

Device 20 further includes a peripheral control block 128, which can be connected to one or more control lines for a system to be controlled by device 20, such as an HVAC system, garage door opener, lighting system, etc. and peripheral control block 128 can receive signals from the connected systems (such as the HVAC system) and/or output control signals thereto in accordance with one or more programs executed by processor 100.

Peripheral control block 128 can include mechanical, or solid state, relays to provide outputs to control lines, as well as a MUX or other suitable devices for receiving relevant input signals from the HVAC or other controlled system and providing those signals to processor 100.

The hardware 42 on device 20 further includes an audio output subsystem 132, which is operable in response to signals received from processor 100, to output an amplified audio signal to a speaker system 136. Audio output subsystem 132 can be a discrete device, or combination of suitable discrete devices, as desired and is preferably capable of outputting voice signals and/or music or other sounds. Best seen in FIG. 6, speaker system 136 includes a speaker driver 140 and a speaker cone 142 (which are in communication with speaker grate 40, shown in FIGS. 2 and 3). By virtue of being mounted along sloped area 52, the speaker system 136 outputs its sound at an angle that is non perpendicular to the back surface (i.e., trim plate 46 or the mounting wall), reducing the amount of sound echoing back into the speaker system 136. When trim plate 46 is in use, a sloped surface 148 on the trim plate 46 helps guide the outputted sound out through a gap 150 between trim plate 46 and housing 24, directing the outputted sound away from both speaker system 136 and microphone apertures 36. The absence or presence of trim plate 46 will affect the performance of speaker system 136 and the quality and volume of its outputted sound, as would the material characteristics of the mounting wall (drywall, brick, plaster, cinderblock, etc.). As such, it is contemplated, that audio output subsystem 132 would include different sound output profiles based upon the device 20's mounting surface. Each sound output profile would shape the frequency and amplitude output of speaker system 136 for optimal performance for its particular mounting surface. Selection of the appropriate sound output profile could be performed by the user via touchscreen 32 or other appropriate means. Alternatively, device 20 could preselect a sound output profile (i.e., "Trim plate present sound profile/"Trim plate not present sound profile") automatically based upon the automated detection of a trim plate 46. Automatic detection could be provide through the use of switches on the back of device 20 (not shown) that detect contact with a trim plate 46, or other appropriate means as will occur to those of skill in the art.

User inputs to device 20 can be achieved via internet connected applications running on smartphones or the like, touchscreen 32 and/or responses from cloud-based processing of voice commands received from the remote processing service by device 20.

When device 20 also serves as a voice command input device for such commands, a user's spoken voice commands are received by microphones 124 and, as is described in more detail below, a representation of that received audio is transmitted by device 20 over the internet or other data network to the remote processing service. The remote processing service receives the transmitted representation of the audio and determines the meaning of the spoken voice commands and prepares an appropriate response which is then returned to device 20 for execution, or otherwise processed by another device or service.

Depending upon the range of services offered by the remote voice processing service, the response to a spoken voice command can be selected from a wide range of responses. For example, the remote processing service may have a limited set of available responses, all directly related to the control and operation of device 20, i.e.—the voice command could have been a request to raise the temperature of the environment controlled by device 20, when serving as an HVAC controller, by one or more degrees and the response returned by the remote voice processing service in such a case would be the necessary program commands for device 20 to raise its target temperature by the one or more degrees the user commanded, along with an audio stream of a voice confirmation.

In a more preferred embodiment, the remote voice processing service is a broadly capable system, such as the above-mentioned ALEXA Voice Service, and the voice commands which can be processed range far beyond those specifically related to the control and operation of device 20. For example, a user can ask for the current time and the remote voice processing service will return an audio stream of a voice saying the current time to device 20, along with the program commands necessary to have that audio stream played to the user through speaker 136.

Similarly, the user may order fast food, such as a pizza, by voice command to device 20 and the remote voice processing service will complete the order, perhaps through an interactive set of audio exchanges with the user through microphones 124 and speaker 136 or in accordance with predefined settings (size of pizza, toppings, payment method, etc.) previously defined by the user, and will forward the resulting order through the internet to the pizza supplier while confirming the same to the user via an appropriate audio voice stream output at device 20.

In this regard, computerized device 20 can perform many or all of the functions of a voice command input device such as the Amazon Echo device, typically used to interact with the ALEXA voice service, or the corresponding Google Home device and service, etc. in addition to performing it's other control functions, such as regulating temperature and/or humidity in an environment.

However, unlike the above-mentioned Echo and/or Home devices, computerized devices such as device 20 face some specific challenges in providing voice command services via a remote voice processing system. In particular, as mentioned above, known implementations of such voice command input devices require a user to preface any spoken command to the system with a wake word or phrase, for example "ALEXA" for the Echo or "Okay Google" for the Google Home. Thus, an appropriate command to the Echo might be, for example, "Alexa, please order me a pizza" which would start the above-mentioned interactive process to complete the order. In contrast, "Order a pizza" would not invoke any response as the wake word was not present.

For an acceptable user experience, a voice command input device should have a very low rate of False Acceptances ("FA"), defined as the case where the voice command device incorrectly determines that the wake word has been received, and a very low rate of False Rejections ("FR"), defined as the case where the voice command device misses (does not recognize) that the wake word has been spoken to it.

To ensure acceptably low rates of FA's and FR's are obtained, existing voice command input devices employ sophisticated, and computationally expensive (often referred to as "tight"), algorithmic models which process captured audio streams to determine, with high probability, the presence of the wake word. The actual tight model employed is not particularly limited and new models are being developed all the time.

The voice command input device continually listens to its surrounding environment, processing the captured audio stream with the tight algorithmic model and, when the presence of the wake word is determined, the voice command input device forwards an audio stream containing the wake word and the subsequently captured audio to the remote voice processing service, as described above.

While such systems have proven to be very successful in providing an acceptable user experience, problems exist in attempting to implement such systems on computerized devices such as device 20. Specifically, the above-mentioned tight algorithmic models used to detect the presence of the wake word require a computationally powerful processor running at a relatively high clock rate to execute the necessary computations, and a processor operating under such conditions draws relatively high amounts of power and generates correspondingly large amounts of waste heat. Depending upon the actual construction and use of computerized device 20, the computation requirements, power requirements and waste heat produced can be significant problems.

For example, if computerized device 20 is an HVAC controller with one or more onboard environmental sensors 108, as described above, the waste heat generated by a processor executing a tight wake word recognition model will affect the readings provided from environmental sensors 108 and will have to be compensated for to obtain accurate temperature readings. A similar heating problem can be experienced for handheld or wearable computerized devices where the waste heat generated may make it uncomfortable for a user to hold or wear the computerized device.

Similarly, if computerized device 20 is battery powered, or is powered from an otherwise limited supply, such as the low current 16 VAC control lines typically employed in HVAC systems, continued high clock rate operation of the processor executing the tight wake word recognition model may overload the power supply or too quickly deplete the battery.

Also, a processor which is capable of continually executing a tight wake word recognition model, in addition to performing other tasks (such as controlling an HVAC or other system or devices) will have to be a more computationally powerful, and hence more expensive, processor than might otherwise be required.

Thus, computerized device 20 employs a two stage approach to wake word recognition which can reduce the average computational processing and electrical power requirements for the ongoing monitoring for the receipt of a wake word and which can correspondingly reduce waste heat generated within device 20 and which can allow for the use of a less computationally powerful processor.

Specifically, in device 20 secondary processor assembly 120 is a low capability (i.e.—computationally) processor, relative to processor 100, and has correspondingly lower electrical power consumption and waste heat generation. Audio signals received via microphones 124 are processed by secondary processor assembly 120 to perform far field audio processing, such as echo cancellation, noise reduction, direction of arrival, gain control, etc. as well as executing a low computational complexity "loose" wake word recognition model.

In contrast to tight models, this loose model is selected and configured for execution by a low powered processor, such as secondary processor assembly 120, with the knowledge that the expected accuracy of the loose model will not meet the overall requirements for acceptably low rates of FA's and FR's. Specifically, the selection criteria for the loose model are not particularly limited as long as the loose model can be executed reasonably quickly (able to process received audio streams at least in real time) and the selected model is configured to provide an FR rate which is acceptably low, albeit at the cost of having a high rate of FA's.

Figure 5:
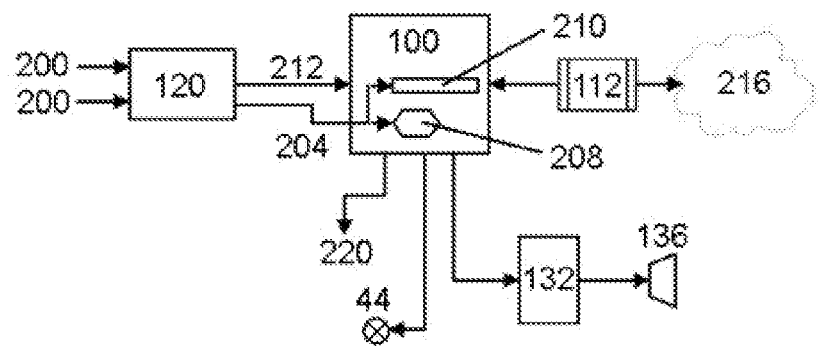
FIG. 5 shows a data flow of the processing of received audio at the device of FIG. 1.

FIG. 5 shows a data flow drawing of the processing of received audio at device 20. As shown, one or more steams of audio 200, from microphones 124, are continually received at secondary processor assembly 120.

On an ongoing basis, secondary processor assembly 120 digitizes the received streams 200 and performs any other desired processing of the streams (i.e.—combining two or more received streams into a single stream, echo cancellation, beam forming, gain, etc.) to form a cleaned stream 204.

A copy of cleaned stream 204 is forwarded by secondary processor assembly 120 to a "look behind" circular buffer 208, implemented in processor 100, which stores a preselected length of the most recently received cleaned stream 204. In a present implementation, circular buffer 208 stores about two seconds of the latest cleaned stream 204.

At this time, processor 100 is running at a reduced clock rate, selected to be sufficient to service the processing load on processor 100 to implement and update circular buffer 208 and to perform any other computational tasks required by the programs processor 100 is executing and processor 100 is not executing the tight model for wake word recognition.

At this reduced clock rate, both the electrical power requirements and waste heat generated by processor 100 are reduced from the corresponding levels which would be experienced when processor 100 is running at a higher clock rate.

Secondary processor assembly 120 also processes cleaned stream 204 with the loose wake word recognition model it is executing. As mentioned above, this loose model is selected and configured to provide an acceptably low rate of FR's at the cost of a relatively high rate of FA's, such that the probability of device 20 missing a user stating a wake word is acceptably low.

Each time the loose wake word recognition model executed by secondary processor assembly 120 determines (correctly or incorrectly) that cleaned stream 204 contains the predefined wake word, secondary processor assembly 120 provides a signal 212 to processor 100. In a present implementation, signal 212 is an interrupt signal, but any other suitable means of signaling processor 100 can be employed as desired.

Upon receipt of signal 212, processor 100 switches itself to operate at a suitably higher clock rate and processor 100 makes a copy of the contents of circular buffer 208 to prevent them from being overwritten by updates from cleaned stream 204. Processor 100 further creates, or reuses, a linear buffer 210 in which it stores the ongoing received cleaned stream 204 from secondary processor subassembly 120 (representing received user speech which occurred after the copied contents of circular buffer 208). Thus, between the copy of the contents of circular buffer 208 and the contents stored in linear buffer 210, processor 100 has a processed audio stream containing the suspected wake word and any subsequent commands spoken by a user.

After copying the contents of circular buffer 208 and setting up and starting to load linear buffer 210, processor 100 commences analysis of the contents of the copied contents of circular buffer 208 with the tight wake word recognition model it implements. The tight wake word recognition model processes the copy of the contents of circular buffer 208 to determine, with both an acceptably low rate of FR's and FA's, whether or not those contents contain the predefined wake word.

As will be apparent, this processing by the tight model essentially verifies, with a higher level of confidence, the determination made by the loose model used in secondary processor assembly 120. As previously stated, the loose model is selected to provide a low level of missed (FR) wake word recognitions at the cost of a relatively high level of false acceptances (FA).

By using this two stage approach where processor 100 verifies the presence, or absence, of the wake word with a tight model, after secondary processor assembly 120 has used a loose model to determine that a wake word has been received, a high probability of correctly detecting the presence of the wake word is obtained, with a reduced average overall level of computation being required as the tight model is not executed on a continuous basis as was the case with prior art voice command input devices.

Thus, on average, the electrical power requirements for processor 100 are reduced, as is the waste heat generated by processor 100. Further, by employing good real time programming practices in interrupting and/or suspending the execution of other programmed tasks on processor 100 when signal 212 is received, the required computational capabilities of processor 100 can be reduced, from an amount required for continuously processing the tight model in addition to the other programs executing on processor 100 to an amount required for the as-needed processing of the tight model while the other programs executed by processor 100 are suspended, or processed at a lower rate by processor 100. This allows for the use of a lower cost device to be employed as processor 100 than would be the case if the tight model were continuously executing on processor 100 in addition to the other programs executing on processor 100.

If the tight model executed by processor 100 determines that the copy of the contents of the circular buffer did not contain the wake word (i.e.—the loose model executed by secondary processor subassembly 120 made a False Acceptance), the copy of the contents of circular buffer 208 is deleted, as is linear buffer 210 and processor 100 returns to a lower clock rate operating mode. Alternatively, linear buffer 210 may be retained to be overwritten the next time processor 100 detects the wake word, or even transmitted to a remote site for analysis and learning of FA conditions.

If the tight model executed by processor 100 determines that the copy of the contents of circular buffer 208 does contain the wake word (i.e.—the determination by the loose model executed by secondary processor subassembly 120 was correct) then processor 100: illuminates activity indicator 44 to provide a visual indication to the user that it has received the wake word and is listening for further commands; connects to a predefined remote voice processing service 216 (such as Amazon Voice Service) via communication module 112; and transfers the circular buffer contents to voice processing service 216 and transfers the current contents of linear buffer 210 (preferably at a rate higher than the rate at which new data is being added to linear buffer 210) and continues to transfer new data added to linear buffer 210 to voice processing service 216.

By transferring the copied contents of circular buffer 208 and linear buffer 210 contents, including any newly added content, voice processing service 216 will receive a continuous portion of clean stream 204 including the alleged wake word and any subsequent user voice commands.

In a presently preferred embodiment, upon receiving the relevant portion of clean stream 204, voice processing service 216 executes an even tighter, and more computationally expensive, algorithmic model to confirm the presence of the wake word as a final verification. In this embodiment, if the tighter model executed by voice processing service 216 determines that the wake word is not in fact present in the data in receives from processor 100, voice processing service 216 sends a signal, representing a "False Accept" condition to processor 100, via communications module 112, and processor 100 then extinguishes activity indicator 44, deletes the copy of circular buffer 208 and linear buffer 210 and returns to a lower clock rate operating mode.

If the tighter model executed by voice processing service 216 confirms the presence of the wake word, or if this verification step is not desired to be performed, voice processing service 216 continues to process the remainder of the received clean stream 204 to determine the user's spoken voice commands.

Once the received spoken commands are determined and processed, voice processing service 216 creates an appropriate response, or responses, for the determined commands and transmits those responses to the devices and/or services appropriate for those responses. For example, if the user voice commands were for computerized device 20 to alter one of the parameters or systems it is controlling, then a response is sent from voice processing service 216 to processor 100, via communication module 112, altering the operation of processor 100, or causing processor 100 to output a desired control signal output 220 to a connected module, component or device such as peripheral control block 128. Any response sent to device 20 will also typically include a suitable voice response confirmation played to the user via audio output subsystem 132 and speaker system 136.

As an example, if the user command was, "Alexa, please raise the temperature by two degrees", voice processing system 216 can send a response to processor 100 including commands to increase the target temperature value stored in its memory by two degrees and to cause processor 100 to announce to the user, "I've raised the temperature by two degrees, as you requested" via audio output subsystem 132 and speaker system 136.

If the user command was, "Alexa, please turn off the fan", voice processing system 216 can send a response to processor 100 including commands to produce control signal output 220 to peripheral control block 128 (or the like) to deactivate the HVAC circulating fan and to cause processor 100 to announce to the user, "I've turned the fan off, as you requested" via audio output subsystem 132 and speaker system 136.

If the user command was, "Alexa, I want to order a pizza", voice processing system 216 can send a response to processor 100 with commands to initiate an appropriate interactive voice process to determine the relevant particulars for the pizza order and to place the order with an appropriate pizza supplier and to cause processor 100 to announce to the user, "OK, I've ordered your pizza, as you requested" via audio output subsystem 132 and speaker system 136.

Once any voice command session is completed, voice processing system 216 provides a session complete response to processor 100 which then deletes linear buffer 210 and the copy of the contents of circular buffer 208 and processor 100 returns to its low power/reduced clock rate operating mode.

While the above-described example of a computerized device in accordance with the present invention is shown as including a set of components appropriate for the HVAC controller of the example, it should be realized that the present invention is not so limited. For example, if computerized device 20 is a garage door opener, touchscreen 32 and environmental sensors 108 can be omitted. Further, the above-described example does not explicitly illustrate the electrical power supply for computerized device 20. In the illustrated example of an HVAC controller, it is contemplated that typically computerized device 20 will be powered parasitically, from power on the HVAC system's control lines. However it is also contemplated that computerized device 20 can be powered from batteries, a separate power supply, etc.

As should now be apparent from the description above, the present invention provides a system and method for recognizing a wake word prefix for a spoken command which is to be processed by a remote voice processing system. The system and method employ a low power processor, with relatively limited processing capability, to execute a loose recognition model which provides a low FR rate, but which is correspondingly subject to an otherwise unacceptably high FA rate. When this loose recognition model determines that the wake word is present in a buffered and stored audio stream, it signals a second, application, processor which is capable of operating at at least a low clock rate and a high clock rate, where the high clock rate results in the application processor being more computationally capable than when operating at the lower clock rate and being more computationally capable than the low power processor, but which also increases the electrical power requirements of the application processor and the amount of waste heat it generates.

Upon receiving the signal, the application processor switches its operation to the higher clock rate and executes a tight recognition model and analyses the contents of the buffered and stored audio stream to verify the presence of the wake word. If the wake word is not present, the application processor returns to operating at the lower clock rate and deletes the buffered and stored audio stream.

If the application processor confirms the presence of the wake word in the buffered and stored audio stream, the buffered and stored audio stream, and subsequent captured audio stream of user commands, is forwarded to the voice processing service for further processing.

This system and method of using a low power processor, and a second, more capable application processor which can operate in at least a low power/low clock rate mode and a high power/high clock rate mode, reduces the average overall electrical power required by the system and method, as well as correspondingly reducing the waste heat generated by the system, and can reduce the level of computational processing capability required by the application processor, thus reducing its cost.

The above-described embodiments of the invention are intended to be examples of the present invention and alterations and modifications may be effected thereto, by those of skill in the art, without departing from the scope of the invention which is defined solely by the claims appended hereto.

I claim:

1. A method of recognizing a wake word for voice commands to a computerized device, comprising the steps of:
   (i) receiving at the computerized device an audio signal from at least one microphone;
   (ii) processing the received audio signal with a first processor in the computerized device, the first processor placing a copy of the processed received audio signal into a circular buffer of a preselected size and the first processor executing a first voice recognition algorithmic model to detect the presence of a predefined wake word, the first voice recognition algorithmic model selected to provide a predefined relative low level of false non-matches of the predefined wake word at the cost of a higher than predefined level of false matches of the predefined wake word;
   (iii) upon the first processor determining a match of the predefined wake word, the first processor providing a second signal to a second processor in the computerized device, the second processor normally operating at a first rate having a first computational capacity, the second signal causing the second processor to commence operating at a second rate having a second computational capacity greater than the first computational capacity, and the second processor:
   (a) copying the contents of the circular buffer into a second buffer;
   (b) copying the processed received audio signal into a third buffer;
   (c) executing a second voice recognition algorithmic model on the contents of the second buffer to verify the presence of the predefined wake word, the second voice recognition algorithmic model requiring greater computational processing than the first voice recognition algorithmic model to achieve a predefined relatively low level of both false non-matches and false matches of the predefined wake word; and
   (d) upon completion of analyzing the contents of the second buffer with the second voice recognition algorithmic model, if the second voice recognition algorithmic model determines that the predefined wake word is not present in the second buffer, returning the second processor to operate at the first rate and, if the second voice recognition algorithmic model determines that the predefined wake word is present in the second buffer, then forwarding the contents of the second buffer and the third buffer to a voice processing service located remote from the computerized device, the voice processing service operable to receive and process voice commands.

2. The method of claim 1 further comprising the step of the second processor activating an activity indicator when the second processor determines, at (c) that the predefined wake word is present in the second buffer.

3. The method of claim 1 where the voice processing service executes a third voice recognition algorithmic model requiring greater computational processing than the second voice recognition algorithmic model, the voice processing service executing the third voice recognition algorithmic model on the copy of the second buffer received at the voice processing service to verify the presence of the wake word therein and, if the third voice recognition algorithmic model does not verify the presence of the wake word, then the voice processing service sending a message to the computerized device indicating that the wake word was not present and the second processor returning to operating at the first rate and, if the third voice recognition algorithmic model does verify the presence of the wake word, then the voice processing service processing the contents of the third buffer.

4. A computerized device comprising:
   at least one microphone to capture user voices;
   a first processor to digitize and process audio received from the at least one microphone and to store a copy of the processed audio in a circular buffer and to execute a first voice recognition algorithmic model to detect the presence of a predefined wake word in the circular buffer, the first voice recognition algorithmic model selected to provide a predefined relative low level of false non-matches of the predefined wake word at the cost of a higher than predefined level of false matches of the predefined wake word;
   a second processor normally operating at a first rate having a first computational capacity and responsive to a signal from the first processor indicating that the first voice recognition algorithmic model has detected the presence of the wake word in the circular buffer such that the second processor commences operation at a second rate having a greater computational capacity than the capacity at the first rate, the second processor receiving a copy of the contents of the circular buffer from the first processor and receiving and buffering a copy of the processed received audio stream in a second buffer, the second processor executing a second voice recognition algorithmic model on the copy of the contents of the circular buffer to verify the presence of the predefined wake word, the second voice recognition algorithmic model requiring greater computational processing than the first voice recognition algorithmic model and being selected to achieve a predefined relatively lower level of both false non-matches and false matches of the predefined wake word than achieved by the first processor; and
   a data communications module operable to provide data communication between the computerized device and a remote voice processing service, the data communications providing the voice processing service with the copy of the contents of the circular buffer and the contents of second buffer to the voice processing service when the second voice recognition algorithmic model verifies the presence of the wake word in the copy of the contents of the circular buffer.

* * * * *